US007010688B1

(12) United States Patent  
Kawasaki

(10) Patent No.: US 7,010,688 B1  
(45) Date of Patent: Mar. 7, 2006

(54) SCHEME, SYSTEM AND EQUIPMENT FOR INTER-EQUIPMENT AUTHENTICATION AND KEY DELIVERY

(75) Inventor: Akihisa Kawasaki, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/432,007

(22) Filed: Nov. 1, 1999

(30) Foreign Application Priority Data

Oct. 30, 1998 (JP) ................................. 10-324448  
Dec. 25, 1998 (JP) ................................. 10-370992

(51) Int. Cl.  
*H04L 9/00* (2006.01)

(52) U.S. Cl. ...................... 713/168; 713/156; 713/157; 713/158; 713/159; 705/64; 705/67

(58) Field of Classification Search ................ 380/168; 705/4, 50–80; 713/168  
See application file for complete search history.

(56) References Cited

U.S. PATENT DOCUMENTS

| | | | |
|---|---|---|---|
| 4,571,492 A | | 2/1986 | Kane et al. |
| 5,485,520 A | * | 1/1996 | Chaun et al. .................. 705/74 |
| 5,534,857 A | | 7/1996 | Laing et al. |
| 5,602,375 A | * | 2/1997 | Sunahara et al. ............ 235/384 |
| 5,809,480 A | * | 9/1998 | Chasek ......................... 705/13 |
| 6,342,844 B1 | * | 1/2002 | Rozin ........................... 340/933 |
| 6,658,392 B1 | * | 12/2003 | Yoshida ...................... 455/41.2 |

FOREIGN PATENT DOCUMENTS

| | | |
|---|---|---|
| DE | 195 23 466 C | 4/1997 |
| EP | 0 427 465 A | 5/1991 |
| EP | 0 772 161 A | 5/1997 |
| EP | 0 809 379 A | 11/1997 |
| EP | 0 939 514 A | 9/1999 |
| JP | 10-20780 | 1/1998 |
| JP | 10-143695 | 5/1998 |

OTHER PUBLICATIONS

European Search Report for EP 99 12 1466, dated Jan. 22, 2004.  
K. Tetsusaki, "High Security Electronic Toll and Traffic Management and Road Pricing System Using Encrypted Messages and Personal Identity Number", 1994 Vehicle Navigation & Information Systems Conference Proceedings, pp. 695-698, Aug. 31, 1994.

* cited by examiner

*Primary Examiner*—Ayaz Sheikh  
*Assistant Examiner*—Syed A. Zia  
(74) *Attorney, Agent, or Firm*—RatnerPrestia

(57) ABSTRACT

An inter-equipment authentication and key delivery scheme, system, and equipment is provided which is capable of making authentication of an IC card ID signature, by comparison of a decrypted ICCID with another ICCID reproduced by dividing transmitted data. The inter-equipment authentication and key delivery scheme, system, and equipment can be used, for example, when an automobile passes by roadside equipment at a tollbooth, and the roadside equipment transmits a random digit (RND) generated therein as challenge data to an IC card via onboard equipment, and the IC card transmits back to the roadside equipment the random digit after encrypting it with a secret key Kicc. The IC card also transmits its ID (ICCID) and a certificate of individual IC card key CERT-Kicc together with the random digit. The roadside equipment divides the transmitted data into a response data E(Kicc, RND), the ICCID, and the certificate of individual IC card key CERT-Kicc. The roadside equipment 130 reproduces the Kicc and the ICCID by decrypting (DEC) the certificate of individual IC card key CERT-Kicc using a validation key PC.

8 Claims, 6 Drawing Sheets

SCHEME, SYSTEM AND EQUIPMENT FOR INTER-EQUIPMENT AUTHENTICATION AND KEY DELIVERY

FIELD OF THE INVENTION

The present invention relates to a scheme, system, and equipment for inter-equipment authentication and key delivery, for example an equipment authentication and cryptographic communications system for making mutual authentication of legitimacy with each other among any of great many user-end equipment provided with an IC card and system-end equipment, and transmitting and receiving data in secrecy from other than the two communicating equipment. Further, as another example the present invention relates to an automated electronic toll collection and authentication system and a method of authentication which is so devised that roadside equipment and central processing equipment are capable of making a direct authentication for the legitimacy of an IC card.

BACKGROUND OF THE INVENTION

In the case of transmitting a valuable data to an opposite party, it is generally necessary to authenticate that equipment of the communicating party is legitimate. It is also necessary that the data on a communications path is kept secret from a third party, and protected from tampering or wrongful alteration on the communications path. An automated electronic toll collection (i.e., an electronic toll collection, which will be hereinafter referred to as "ETC") system on a highway using wireless communications is a typical example that requires such feature of communications security.

The system executes a toll collection for a highway by means of communications between onboard equipment installed in an automobile and roadside equipment provided at a gate of a tollbooth. In this instance, the onboard equipment and the roadside equipment respectively imply user-end equipment and system-end equipment. The onboard equipment is provided with a removable IC card. The IC card has a function of prepaid card, and it is imprinted with information of a cash balance beginning with a given amount (e.g. 10,000 yen).

At a gate of a highway entrance (hereinafter referred to as "entrance gate"), the onboard equipment transmits information of an ID number of the onboard equipment to the roadside equipment, and the roadside equipment transmits to the onboard equipment information of an entry (such as a gate number and time of the entry), which is recorded in the IC card.

At a gate of a highway exit (hereinafter referred to as "exit gate"), on the other hand, the onboard equipment transmits the entry information and cash balance information to another roadside equipment, so that the roadside equipment computes a toll charge of the highway according to the entry information. The roadside equipment revises the cash balance by subtracting the toll charge from the previous cash balance, and transmits the balance information to the onboard equipment. The roadside equipment makes a transaction for unsettled payment, if the cash balance is short of the toll charge.

Settlement for the toll charge of highway with wireless communications in the foregoing manner is intended to reduce traffic congestion at entrance and exit gates. It is anticipated that there are several millions of onboard equipment, and several thousands of roadside equipment in one system.

In order for the system to operate successfully, the following security problems must be cleared, in addition to achieving infallible high-speed wireless communications.

First, the roadside equipment must authenticate that individual onboard equipment is legitimate. It must make an immediate determination of forgery for any communications made with counterfeit onboard equipment or a forged IC card, so as to take a countermeasure such as closing the gate or recording a vehicle license number. On the other hand, it is also necessary for the onboard equipment to authenticate that the roadside equipment is legitimate. Even if someone has attempted to obtain an economical gain by making a communications to the onboard equipment with counterfeit roadside equipment, and rewriting information in an IC card with a toll charge for a shorter section than what it should be, the onboard equipment must be so designed that such attempt shall fail.

Further, the system shall be such that communications between the onboard equipment and the roadside equipment is not intercepted by a third party, and contents of it are protected from being used fraudulently.

The required conditions as described above can be satisfied with an addition of such features generally known as authentication function and cryptographic function to the wireless communications. As one way of realizing the foregoing functions, the onboard equipment and the roadside equipment need to share a secret key cryptographic algorithm and certain secret information. The secret information is generally called a cryptographic key or a decryption key.

It is important to note that there is a quite large number of onboard equipment used in this system. A consideration is given now for a case that secret information of onboard equipment "X" is identical to secret information of onboard equipment "Y". If there is counterfeit onboard equipment "X'", which is made by analyzing a content of the onboard equipment "X", the system is able to prevent an unlawful use of the onboard equipment "X'"by utilizing a negative list for excluding such unlawful use of the equipment "X'". However, the negative list also excludes a proper use of the legitimate onboard equipment "Y" at the same time. For this reason, the secret information for individual onboard equipment needs to be different from one another.

In this case, the matter of how the roadside equipment obtains the secret information of individual onboard equipment is important. One of the methods is to store information consisting of an ID and secret information for every one of the onboard equipment, in the roadside equipment. However, this method creates a big burden when renewing contents stored in several thousands of the roadside equipment employed in the system. It also has a weakness in security that the secret information for all of the onboard equipment is disclosed, if any one of the roadside equipment is analyzed.

As described, the prior art system for equipment authentication and cryptographic communications, if used for realizing the system security, has a problem that a wrongful analysis of system-end equipment causes a detrimental effect to all of the user-end equipment.

In addition, the ETC authentication system of the prior art, due to a restriction in the system, makes a two-step authentication, in which the roadside equipment verifies the onboard equipment, and the onboard equipment verifies the IC card. That is, the system can make only an indirect authentication of the IC card.

A method of the foregoing authentication will be described further by referring to FIG. 5 and FIG. 6. FIG. 5 depicts an operation of mutual authentication between an IC card and onboard equipment.

In FIG. 5:

(1) An IC card ICC 41 transmits to onboard equipment, or OBE, 42, a certificate of verified IC card key CERT-PICP issued by an ETCS key center and a certificate of individual IC card key CERT-KICC given by an IC card issue center. At the same time, the IC card 41 also transmits to the onboard equipment 42 a random digit R2 generated therein as a challenge data for it to make an authentication of the onboard equipment;

(2) The onboard equipment 42 produces a validation key PICP issued by the IC card issue center from the certificate of verified IC card key CERT-PICP by means of restorable-type signature authentication, Rverify (Pc1, CERT-PICP) using a validation key Pc1 provided by the ETCS key center;

(3) The onboard equipment 42 produces an individual IC card key KICC from the certificate of individual IC card key CERT-KICC by means of restorable-type signature authentication, Rverify (PICC, CERT-KICC) using the PICP;

(4) The onboard equipment 42 generates a session key Ks1 and returns it to the IC card 41, after encrypting it with the individual IC card key KICC produced in the above step, i.e., after making a process of E(KICC, Ks1). In addition, the onboard equipment 42 generates a random digit R1, encrypts R1∥R2, and returns the encrypted result, or E(Ks1, R1∥Rb2) to the IC card 41 as a response to the random digit R2. The IC card 41 compares a decrypted result of it with the originally generated random digit R2 to determine if they match in order to authenticate that the onboard equipment 42 is legitimate, and continues a subsequent transaction. The IC card 41 discontinues the transaction if they do not match;

(5) The onboard equipment 42 encrypts the random digit R1 generated therein with the received random digit R2 using the key Ks1, and transmits a result E(Ks1, R1∥R2) as a challenge to the IC card 41. The IC card 41 decrypts it to produce the random digit R1, encrypts it with a session key Ks2, i.e. a transaction for E(Ks1, R1∥Ks2), and returns it to the onboard equipment 42 as a response; and (6) The onboard equipment 42 decrypts the encrypted random digit by the session key Ks1, compares the result with the originally generated random digit R1, and continues a subsequent transaction, if they match so that the IC card 41 is verified as being legitimate. The onboard equipment 42 discontinues the transaction if they do not match.

As described, an execution of the above authentication protocol can attain the mutual authentication between the IC card 41 and the onboard equipment 42, as a first step. As a second step, a mutual authentication between the onboard equipment and the roadside equipment will be described.

FIG. 6 depicts an operation of the mutual authentication between the onboard equipment and the roadside equipment.

In FIG. 6:

(1) Onboard equipment, or OBE, 51 encrypts a random digit K using an individual key KOBE, and sends the encrypted data E(KOBE, K) and a certificate of individual onboard equipment key CERT-KOBE to the roadside equipment, or RSE, 52;

(2) The roadside equipment 52 produces OBEID∥KOBE from the certificate of individual onboard equipment key CERT-KOBE with a signature authentication key Pc2 of the ETCS key center, by the following formula;

$$X = c1P + c2Q = OBEID \| KOBE$$

(3) The onboard equipment 51 sends a challenge data K generated therein to the roadside equipment 52, and authenticates the roadside equipment 52 by confirming that the roadside equipment 52 can properly decrypt it using the individual key KOBE; and (4) The roadside equipment 52 encrypts the challenge data R2 generated therein with the individual key KOBE, i.e. a transaction for E(KOBE, K∥R2), and authenticates the onboard equipment 51 by confirming that the onboard equipment 51 can decrypt it.

As has been described, the ETC authentication system of the prior art makes a two-step authentication, in which the roadside equipment authenticates the onboard equipment, and the onboard equipment authenticates the IC card, so that the roadside equipment can make only an indirect authentication of the IC card. Accordingly, the prior art system has a problem of not being capable of directly exchanging data between the IC card and the roadside equipment, when the onboard equipment passes under the roadside equipment. It also has another problem that the system is not escapable from becoming complicated and costly because of the two-step authentication.

The present invention is therefore intended to provide an ETC authentication system and a method of the authentication, in which roadside equipment and central processing equipment are capable of making a direct authentication for legitimacy of an IC card.

SUMMARY OF THE INVENTION

A scheme, system, and equipment for inter-equipment authentication and key delivery of the present invention is an equipment authentication and cryptographic communications system, which includes user-end equipment, an "m" number of system-end equipment, and a key center for administrating legitimacy of all of the equipment. Each of an "n" number of the user-end equipment has individual user-end equipment's information issued by the key center, and individual user-end equipment's secret information corresponding to the individual user-end equipment's information. The user-end equipment transmits the individual user-end equipment's information to the system-end equipment. The system-end equipment receives the individual user-end equipment's information from the user-end equipment, and reproduces the individual user-end equipment's secret information from the received individual user-end equipment's information. The system-end equipment makes an authentication of legitimacy of the user-end equipment by confirming that the user-end equipment has the individual user-end equipment's secret information by means of a challenge response utilizing a common key cryptographic algorithm. The user-end equipment and the system-end equipment then make a cryptographic communications using the individual user-end equipment's secret information shared mutually between them.

The foregoing structure allows the system-end equipment to share the individual user-end equipment's secret information for each of the user-end equipment without storing it in a form of database, and enables the system-end equipment to make an authentication of legitimacy of the user-end equipment as well as a cryptographic communications.

In the scheme, system, and equipment for inter-equipment authentication and key delivery of the present invention, the system-end equipment has same system-end equipment's secret information as the one possessed by the key center, and produces individual user-end equipment's secret information from the individual user-end equipment's information using the system-end equipment's secret information. The user-end equipment makes an authentication of legitimacy of the system-end equipment by confirming that the system-end equipment has the individual user-end equipment's secret information by way of a challenge response utilizing the common key cryptographic algorithm.

The above-described structure allows the system-end equipment and the individual user-end equipment to share the individual user-end equipment's secret information, and enables the user-end equipment to make an authentication of legitimacy of the system-end equipment as well as a cryptographic communications.

In the scheme, system, and equipment for inter-equipment authentication and key delivery of the present invention, the system-end equipment is also provided with a secret key cryptographic algorithm and means for reproducing the individual user-end equipment's secret information by making a system-conversion of the individual user-end equipment's information using a secret key.

The above-described structure allows the system-end equipment to share the individual user-end equipment's secret information for each of the user-end equipment without storing it in a form of database, to make an authentication of legitimacy of the user-end equipment using the mutually shared individual user-end equipment's secret information, and to make a cryptographic communications.

In the scheme, system, and equipment for inter-equipment authentication and key delivery of the present invention, the system-end equipment and the user-end equipment are both provided with means for making a cryptographic communications using information shared mutually between them by exchanging secret information that they possess individually.

The above-described structure allows the system-end equipment to share the individual user-end equipment's secret information for each of the user-end equipment without storing it in a form of database. Also, even if either the system-end equipment or the user-end equipment is analyzed, the cryptographic communications can not be intercepted only with information disclosed by the analysis.

In the scheme, system, and equipment for inter-equipment authentication and key delivery of the present invention, the system-end equipment and the user-end equipment are both provided with means for making a cryptographic communications by way of exchanging secret information that they possess individually, and generating new secret information for the cryptographic communications by combining their own secret information with the exchanged information according to a prearranged procedure.

With the above-described structure, even if either the system-end equipment or the user-end equipment is analyzed, the cryptographic communications can not be interpreted only with information disclosed by the analysis.

In the scheme, system, and equipment for inter-equipment authentication and key delivery of the present invention, the system-end equipment and the user-end equipment are both provided with means for: (a) generating secret information by encrypting the new secret information, which has been exchanged and combined in the above-cited step, with the individual user-end equipment's secret information; and (b) making a cryptographic communications using the secret information.

With the above-described structure, even if communications is intercepted in both ways between the system-end equipment and the user-end equipment, the cryptographic communications can not be interpreted only with information disclosed by the interception.

In the scheme, system, and equipment for inter-equipment authentication and key delivery of the present invention, the system-end equipment and the user-end equipment are both provided with means for (a) generating their respective random digits individually; (b) exchanging the information with each other as separate secret information; and (c) having a cryptographic communications.

With the above-described structure, even if the individual user-end equipment's secret information is disclosed as a result of interception of the communications in both ways between the system-end equipment and the user-end equipment, the subsequent cryptographic communications will not carry the same risk of interception.

In the scheme, system, and equipment for inter-equipment authentication and key delivery of the present invention, the system-end equipment and the user-end equipment are both provided with means for: (a) generating their respective random digits individually; (b) combining own information peculiar to each of the system-end equipment and the user-end equipment with the random digits according to a predetermined procedure; (c) generating secret information by encrypting the combined information with the individual user-end equipment's secret information; (d) exchanging the encrypted information with each other as separate individual secret information; (e) decrypting the combined information by using the individual user-end equipment's secret information shared mutually between them in the foregoing step; (f) breaking the combination according to a predetermined procedure; (g) mutually sharing the random digits exchanged with each other between the system-end equipment and the user-end equipment as individual secret information in the same manner as the random digits they generated individually; and (h) making a cryptographic communication.

With the foregoing structure, even if the communication is wrongfully intercepted in both ways between the system-end equipment and the user-end equipment and a replay attack is attempted, the cryptographic communication carries no risk of getting the content interpreted.

In the scheme, system, and equipment for inter-equipment authentication and key delivery of the present invention, the system-end equipment and the user-end equipment are both provided with means for: (a) generating their respective random digits individually; (b) exchanging the random digits with each other; (c) again generating new random digits individually and independently from each other; (d) combining these new random digits with the other random digits according to a predetermined procedure; (e) generating secret information by encrypting the combined information using the individual user-end equipment's secret information; and (f) making a cryptographic communication using the foregoing information as individual secret information.

With the above structure, even if the communication is intercepted in both ways between the system-end equipment and the user-end equipment, a replay attack is attempted, and the individual user-end equipment's secret information is disclosed, the cryptographic communication still carries no risk of getting the content interpreted.

Further, the scheme, system, and equipment for inter-equipment authentication and key delivery of the present invention includes (i) an IC card, which includes: an encryption means for receiving via on-board equipment a challenge data generated by roadside equipment, as the IC card passed by the roadside equipment, and encrypting the received data with a legitimate secret key; a data storage means for storing data encrypted by the encryption means; and a response data transmission means for transmitting each individual data of an IC card ID and a certificate of individual IC card key originally assigned to the IC card, together with the encrypted data stored in the data storage means as a response data to the roadside equipment via the on-board equipment, (ii) the roadside equipment, which includes: a dividing means for dividing the transmitted response data into three sections; a decryption means for decrypting data of the certificate of individual IC card key data divided by the dividing means, using a validation key; a matching determination means for making a matching determination of the IC card ID produced as a result of the decryption with another IC card ID obtained by the dividing means; and a challenge data transmission means for transmitting the challenge data to the IC card, and (iii) central processing equipment, which includes: a challenge data storage means for storing the challenge data generated by the roadside equipment; and a matching determination means for receiving the response data decrypted by the roadside equipment, and carrying out a matching determination of the received response data with the challenge data stored in the challenge data storage means.

As described, the scheme, system, and equipment for inter-equipment authentication and key delivery is characterized by making a direct authentication of the IC card ID by means of the roadside equipment, which authenticates signature information received at the same time with the IC card ID, and the central processing equipment, which makes a matching determination of the response data encrypted in the IC card and decrypted in the roadside equipment.

Accordingly, the present invention enables the system to make a direct authentication of the IC card ID because of the foregoing structure, in which the roadside equipment authenticates signature information received at the same time with the IC card ID, and the central processing equipment makes the matching determination of the response data encrypted in the IC card and decrypted in the roadside equipment.

Furthermore, the scheme, system, and equipment for inter-equipment authentication and key delivery of the present invention includes the steps of: (a) encrypting a challenge data, which is generated by roadside equipment at a time when an IC card passes by the roadside equipment and transmitted to the IC card via on-board equipment, in the IC card using a legitimate secret key; (b) storing the encrypted data; (c) transmitting each individual data of an IC card ID and a certificate of individual IC card key, in addition to the stored data, as a response data to the roadside equipment via the on-board equipment; (d) dividing the transmitted response data into three sections in the roadside equipment; (e) decrypting the divided data of the certificate of individual IC card key using a validation key; (f) carrying out a matching determination of the IC card ID produced as a result of the decryption with another IC card ID obtained from the dividing step; and (g) carrying out a matching determination of the response data decrypted by the roadside equipment, in the central processing equipment.

As described, the present invention is a method of ETC authentication characterized by making a direct authentication of the IC card ID by means of the roadside equipment, which authenticates signature information received at the same time with the IC card ID, and the central processing equipment, which makes a matching determination of the response data encrypted in the IC card and decrypted in the roadside equipment. Accordingly, the above method is capable of making a direct authentication of the IC card ID, since the roadside equipment executes the authentication of signature information received at the same time with the IC card ID, and the central processing equipment makes the matching determination of the response data encrypted in the IC card and decrypted in the roadside equipment.

Moreover, the scheme, system, and equipment for inter-equipment authentication and key delivery of the present invention includes (i) a first roadside equipment, which includes a challenge data and time generator/storage means for generating and storing a challenge data and a time of day, and transmitting the data to an IC card via on-board equipment, (ii) the IC card, which includes: an ID transmission means for transmitting an IC card ID immediately before the IC card passes by the first roadside equipment; an encryption means for receiving via the on-board equipment the challenge data and the time of day generated by the first roadside equipment, as the IC card passed by the first roadside equipment, and encrypting the received data with a legitimate secret key; and a response data transmission means for transmitting each individual data of the IC card ID and a certificate of individual IC card key originally assigned to the IC card, together with the encrypted data as a response data to second roadside equipment via the on-board equipment, (iii) the second roadside equipment, which includes: a first dividing means for dividing the response data into three sections; a decryption means for decrypting data of the certificate of individual IC card key divided by the first dividing means, using a validation key; and a matching determination means for carrying out a matching determination of the IC card ID produced as a result of the decryption with another IC card ID obtained by the dividing means, and (iv) central processing equipment, which includes: a second dividing means for dividing the challenge data generated by the first roadside equipment and the IC card ID; a third dividing means for dividing the response data and the IC card ID decrypted in the second roadside equipment; and a matching determination means for making a matching determination of the challenge data obtained by the second dividing means and the response data obtained by the third dividing means.

As described, the foregoing structure of this invention constitutes an ETC authentication system characterized by making a direct authentication of the IC card ID by means of the second roadside equipment, which executes an authentication of signature information received at the same time with the IC card ID, and the central processing equipment, which makes a matching determination of the response data encrypted in the IC card and decrypted in the second roadside equipment. Accordingly, the invention enables the ETC authentication system to make a direct authentication of the IC card ID, because the roadside equipment executes the authentication of signature information received at the same time with the IC card ID, and the central processing equipment makes the matching determination of the response data encrypted in the IC card and decrypted in the roadside equipment.

Also, the ETC authentication system representing the scheme, system, and equipment for inter-equipment authentication and key delivery of the present invention further includes, in addition to the above-described structure of the second roadside equipment, another decryption means for decrypting the encrypted data produced by the dividing means, using a secret key for the individual IC card reproduced by the decryption means, and a validation means for obtaining the time information, at which the IC card has passed by the first roadside equipment, from the decrypted result of the decryption means, and for confirming whether or not a difference between the time information and the present time of day is within a predetermined time period. As a result, the ETC authentication system is able to determine whether the time taken for passing through between the two of roadside equipment is legitimate or not, and to place the IC card ID in a negative list if it determines the passage as illegitimate.

Furthermore, the scheme, system, and equipment for inter-equipment authentication and key delivery of the present invention includes the steps of: (a) receiving a card ID from an IC card via on-board equipment immediately before the IC card passes by first roadside equipment; (b) transmitting via on-board equipment to the IC card a challenge data and a time of day generated by the first roadside equipment, as the IC card passed by the first roadside equipment, and encrypting the data with a legitimate secret key in the IC card; (c) transmitting each individual data of the IC card ID and a certificate of individual IC card key, in addition to the encrypted data, as a response data to second roadside equipment via the on-board equipment; (d) dividing the received response data into three sections in the second roadside equipment; (e) decrypting the divided data of the certificate of individual IC card key using a validation key; (f) carrying out a matching determination of the IC card ID produced as a result of the decryption with another IC card ID obtained in the dividing step; and (g) executing in central processing equipment a matching determination of the challenge data obtained in the first roadside equipment and the response data decrypted in the second roadside equipment.

As described, the foregoing steps of this invention constitute an ETC authentication method characterized by making a direct authentication of the IC card ID through the process of: executing an authentication of signature information received at the same time with the IC card ID in the second roadside equipment; and making a matching determination of the response data encrypted in the IC card and decrypted in the second roadside equipment, in the central processing equipment. Accordingly, the above method of the invention enables the ETC authentication system to make a direct authentication of the IC card ID, because the roadside equipment executes the authentication of signature information received at the same time with the IC card ID, and the central processing equipment makes the matching determination of the challenge data encrypted in the IC card and decrypted in the roadside equipment.

Also, the scheme, system, and equipment for inter-equipment authentication and key delivery of the present invention provides an ETC authentication method, which further includes, in addition to the above-described method, a step of: decrypting the encrypted data produced by the dividing step using a secret key for the individual IC card reproduced in the decryption step, and a step of obtaining the time information, at which the IC card has passed by the first roadside equipment, from the result of the decryption step, and confirming whether or not a difference between the time information and the present time of day is within a predetermined time. Accordingly, the foregoing method enables the ETC authentication system to make a determination as to whether the time taken for the passage is legitimate or not, and to place the IC card ID in a negative list if it determines the passage is illegitimate.

The scheme, system, and equipment for inter-equipment authentication and key delivery of the present invention includes (i) a first roadside equipment, which includes a challenge data generation means for generating a challenge data, and transmitting the data to an IC card via on-board equipment, (ii) the IC card, which includes: an ID transmission means for transmitting an IC card ID immediately before the IC card passes by the first roadside equipment; an encryption means for receiving via the on-board equipment the challenge data generated by the first roadside equipment, as the IC card passed by the first roadside equipment, and encrypting the data with a legitimate secret key; and a response data transmission means for transmitting each individual data of the IC card ID originally assigned to the IC card and a certificate of individual IC card key, together with the encrypted data as a response data to second roadside equipment via the on-board equipment, (iii) the second roadside equipment, which includes: a first dividing means for dividing the response data into three sections; a decryption means for decrypting data of the certificate of individual IC card key divided by the first dividing means, using a validation key; and a matching determination means for carrying out a matching determination of the IC card ID produced as a result of the decryption with another IC card ID obtained by the dividing means, and (iv) central processing equipment, which includes: a second dividing means for dividing the challenge data generated by the first roadside equipment and the IC card ID; a third dividing means for dividing the response data decrypted in the second roadside equipment and the IC card ID; and a matching determination means for making a matching determination of the challenge data obtained by the second dividing means and the response data obtained by the third dividing means.

As described, the foregoing structure of this invention constitutes an ETC authentication system characterized by making a direct authentication of the IC card ID by means of the second roadside equipment, which executes an authentication of signature information received at the same time with the IC card ID, and the central processing equipment, which makes a matching determination of the response data encrypted in the IC card and decrypted in the second roadside equipment. Accordingly, the invention enables the ETC authentication system to make a direct authentication of the IC card ID, because the roadside equipment executes the authentication of signature information received at the same time with the IC card ID, and the central processing equipment makes the matching determination of the response data encrypted in the IC card and decrypted in the roadside equipment.

Also, the scheme, system, and equipment for inter-equipment authentication and key delivery of the present invention includes the steps of: (a) receiving a card ID from an IC card via on-board equipment immediately before the IC card passes by first roadside equipment; (b) transmitting via on-board equipment to the IC card a challenge data generated by the first roadside equipment, as the IC card passed by the first roadside equipment, and encrypting the data with a legitimate secret key; (c) transmitting each individual data of the IC card ID and a certificate of individual IC card key, in addition to the encrypted data, as a response data to second roadside equipment via the on-board equipment; (d) dividing the received response data into three sections in the second roadside equipment; (e) decrypting the divided data of the certificate of individual IC card key using a validation key; (f) carrying out a matching determination of the IC card ID produced as a result of the decryption with another IC card ID obtained by the dividing step; and (g) executing in central processing equipment a matching determination of the challenge data obtained in the first roadside equipment with the response data decrypted in the second roadside equipment.

As described, the foregoing steps of this invention constitute an ETC authentication method characterized by making a direct authentication of the IC card ID through the process of: executing an authentication of signature information received at the same time with the IC card ID, in the second roadside equipment; and making a matching determination of the response data encrypted in the IC card and decrypted in the second roadside equipment, in the central processing equipment. Accordingly, the above method of the invention enables the ETC authentication system to make a direct authentication of the IC card ID, because the roadside equipment executes the authentication of signature information received at the same time with the IC card ID, and the central processing equipment makes the matching determination of the response data encrypted in the IC card and decrypted in the roadside equipment.

DESCRIPTION OF THE PREFERRED EMBODIMENTS

First Exemplary Embodiment

A scheme, system, and equipment for inter-equipment authentication and key delivery of a first exemplary embodiment of the present invention will be described by referring to FIG. 1.

Figure 1:
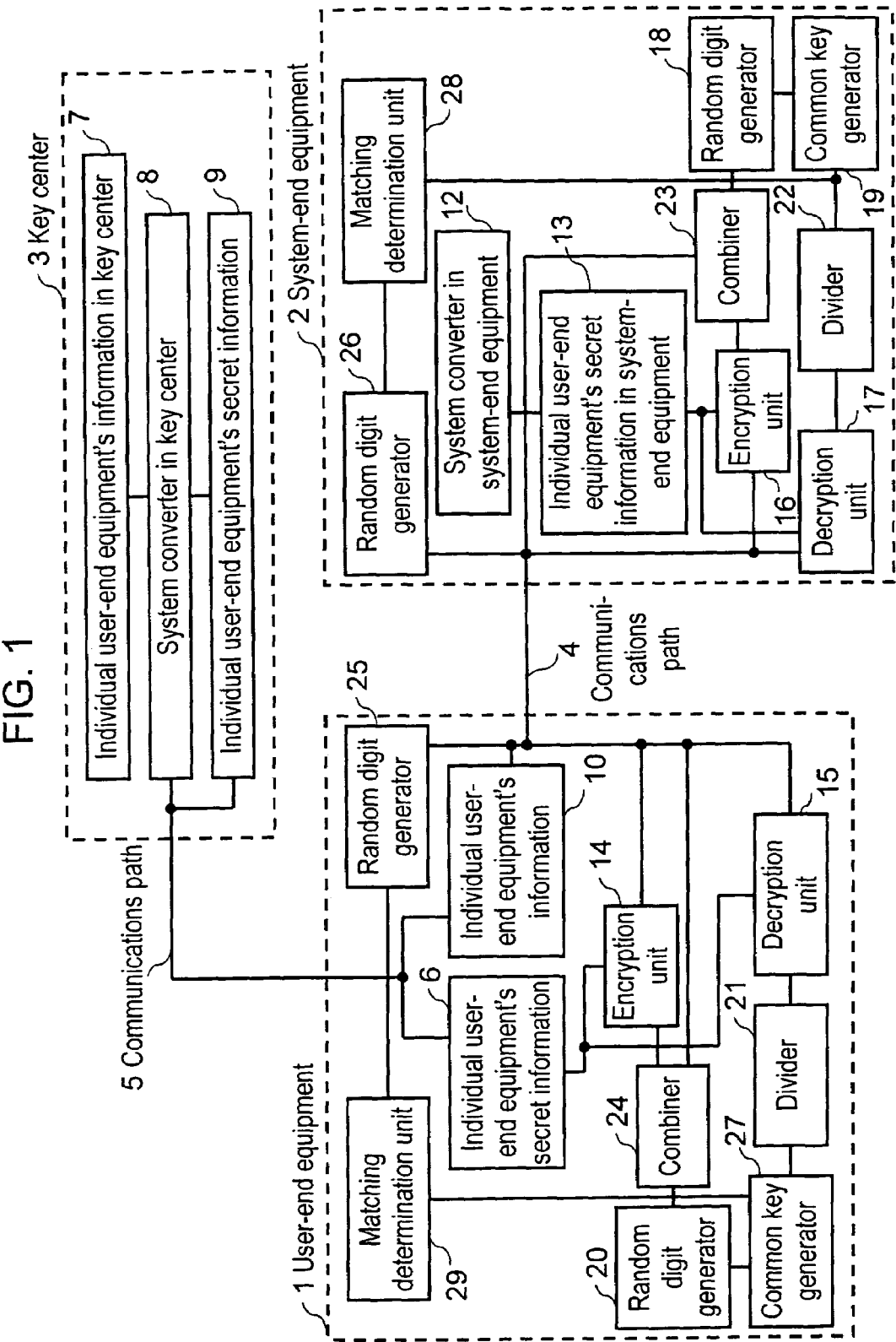
FIG. 1 is a block diagram depicting an overall structure of an equipment authentication and cryptographic communications system of a first exemplary embodiment of the present invention.

With reference to FIG. 1, the present system and equipment include user-end equipment 1, system-end equipment 2, and a key center 3 for administrating legitimacy of all of the equipment. In this exemplary embodiment, the user-end equipment 1 and the system-end equipment 2 respectively imply onboard equipment and roadside equipment, in particular, in an electronic toll collection system ("ETC system").

The key center 3 is an administration center for controlling an entire system, and it carries out a data communications with the user-end equipment 1 through a communications path 5. The user-end equipment 1 carries out a data communications with the system-end equipment 2 through a public communications path 4. The public communications path 4 implies that it carries a risk of being tapped and the tampering by a mala fide third party.

On the other hand, the communications path 5 for coupling between the key center 3 and the user-end equipment 1 or the system-end equipment 2 is a private communications path for communicating data. The private communications path 5 implies that data can not be intercepted and tampered even by a mala fide third party.

The user-end equipment 1 contains individual user-end equipment's secret information 6. A first object of this exemplary embodiment is for the system-end equipment 2 to share the individual user-end equipment's secret information 6 by producing it from individual user-end equipment's information 10, which is transmitted through the public communications path 4.

After the first object is cleared, a second object is for the system-end equipment 2 to make authentication and cryptographic communications through the public communications path 4 using the individual user-end equipment's secret information 6.

On the other hand, the key center 3 has an individual user-end equipment's information 7. A system converter 8 in the key center 3 creates individual user-end equipment's secret information 9 by making a system-conversion of the individual user-end equipment's information 7.

The user-end equipment 1 receives the individual user-end equipment's secret information 9 and the individual user-end equipment's information 7 from the key center 3 via the private communications path 5, and keeps them as the individual user-end equipment's secret information 6 and the individual user-end equipment's information 10.

The system-end equipment 2 is provided with a system converter 12, which is equivalent to the system converter 8 of the key center 3. In other words, the system-end equipment 2 has the same secret information as the one possessed by the key center 3. The system converter 12 in the system-end equipment 2 converts the individual user-end equipment's information 10 transmitted from the user-end equipment 1 via the public communications path 4 in the corresponding manner as the system converter 8. With this conversion, the system-end equipment 2 is able to reproduce individual user-end equipment's secret information 13, which contains an identical data as that of the individual user-end equipment's secret information 6. The data reproduced by the above conversion is stored in the system-end equipment 2 as the individual user-end equipment's secret information 13. The foregoing process makes the user-end equipment 1 and the system-end equipment 2 to share the individual user-end equipment's secret information 6, and thereby clearing the first object.

Moreover, the user-end equipment 1 is provided with an encryption unit 14 and a decryption unit 15 having a common key cryptographic algorithm. A random digit generator 20 generates a random digit 20. Likewise, another random digit generator 25 generates a random digit 25. A combiner 24 has a function of combining two random digit data by assembling them in a predetermined procedure. On the contrary, a divider 21 has a function of reproducing the original random digits by breaking the combination and dividing the assembled random digits.

The system-end equipment 2 is provided with an encryption unit 16 and a decryption unit 17 having the same common key cryptographic algorithm as the user-end equipment 1. A random digit generator 18 generates the random digit 18. Likewise, another random digit generator 26 generates a random digit 26. A combiner 23 has a function of combining two random digit data input therein by assembling them according to a predetermined procedure. On the contrary, a divider 22 has a function of breaking the combination and dividing the assembled and combined random digits.

Next, a concrete operation of the system of this exemplary embodiment will be described by separating it into three phases, which are: (A) individual user-end information delivery phase; (B) authentication and key-sharing phase; and (C) cryptographic communications phase.

(A) Individual User-End Information Delivery Phase (1) The key center 3 produces the individual user-end equipment's secret information 9 from the individual user-end equipment's information 7 with the system converter 8, and transmits it to the user-end equipment 1 through the private communications path 5.

(2) The user-end equipment 1 keeps the individual user-end equipment's information 7 and the individual user-end equipment's secret information 9 received from the key center 3, as the individual user-end equipment's information 10 and the individual user-end equipment's secret information 6 respectively. The user-end equipment 1 transmits the individual user-end equipment's information 10 to the system-end equipment 2 through the public communications path 4

(3) The system-end equipment 2 produces the individual user-end equipment's secret information 13 by making a system-conversion of the received individual user-end equipment's information 10 with the system converter 12. The individual user-end equipment's secret information 13 produced in the above step is identical to the individual user-end equipment's secret information 6 kept in the user-end equipment 1, since the system converter 12 in the system-end equipment 2 is equivalent to the system converter 8 in the key center 3. The system-end equipment 2 has a secret key cryptographic algorithm, and therefore it is capable of producing the individual user-end equipment's secret information 13 through an execution of system-conversion of the individual user-end equipment's information 10 with a secret key. In this instance, the key center 3 also has the same secret key cryptographic algorithm and the same secret key as the system-end equipment 2.

The individual user-end equipment's secret information shared mutually in the above step is utilized as a common key for encryption and decryption by the encryption unit 14 and decryption unit 15 in the user-end equipment 1, and the encryption unit 16 and decryption unit 17 in the system-end equipment 2 in the next authentication and key-sharing phase.

(B) Authentication and Key-Sharing Phase (4) The user-end equipment 1 generates the random digit 25 in the random digit generator 25, and transmits it to the system-end equipment 2 as a challenge data.

(5) The system-end equipment 2 generates the random digit 18 in the random digit generator 18.

(6) The system-end equipment 2 combines the random digit 18 and the random digit 25 transmitted from the user-end equipment 1 in a combiner 23. The system-end equipment 2 then encrypts the combined data in the encryption unit 16 using the individual user-end equipment's secret information 13, and transmits it to the user-end equipment 1 as a response to the random digit 25.

(7) The user-end equipment 1 decrypts the received encrypted data in the decryption unit 15 using the individual user-end equipment's secret information 6, and reproduces the random digit 18 and the random digit 25 in the divider 21.

(8) The user-end equipment 1 produces in a common key generator 27 secret information for use in a cryptographic communications by combining the random digit 18 reproduced in the previous step and the random digit 20 generated by its own random digit generator 20. This secret information is named a common key.

(9) The user-end equipment 1 makes a determination of the challenge response, at the same time, in a matching determination unit 29 by comparing the reproduced random digit 25 with another random digit 25 generated by its own random digit generator 25. The user-end equipment 1 authenticates the system-end equipment 2 as legitimate, if these random digits match.

(10) The system-end equipment 2 generates a random digit 26 in the random digit generator 26, and transmits it to the user-end equipment 1 as a challenge data.

(11) The user-end equipment 1 combines the random digit 20 generated by the random digit generator 20 with the random digit 26 transmitted from the system-end equipment 2 in the combiner 24. The user-end equipment 1 then encrypts the combined data in the encryption unit 14 using the individual user-end equipment's secret information 6, and transmits it to the system-end equipment 2 as a response to the random digit 26.

(12) The system-end equipment 2 decrypts the received encrypted data in the decryption unit 17 using the individual user-end equipment's secret information 13, and reproduces the random digit 20 and the random digit 26 in the divider 22.

(13) The system-end equipment 2 produces secret information for cryptographic communications in a common key generator 19, by combining the random digit 20 reproduced in the previous step and the random digit 18 generated by its own random digit generator 18. This secret information is identical to the secret information of the user-end equipment 1 produced in the step (8), and named a common key.

(14) At the same time, the system-end equipment 2 makes a determination of the challenge response in a matching determination unit 28 by comparing the reproduced random digit 26 with another random digit 26 generated by its own random digit generator 26. The system-end equipment 2 thus authenticates the user-end equipment 1 as legitimate, if both random digits match.

(C) Cryptographic Communications Phase

(15) If the authentications are successfully completed in the foregoing authentication and key-sharing phase, the user-end equipment 1 and the system-end equipment 2 replace the key information in their respective encryption units and decryption units with the common key, i.e. the data obtained by combining the random digit 20 and the random digit 18, which is shared mutually in the foregoing authentication and key-sharing phase.

(16) The user-end equipment 1 and the system-end equipment 2, both of which share the above-cited common key, now start a cryptographic communications with each other by their respective encryption units and decryption units.

The described exemplary embodiment is an example, in which each of the system-end equipment 2 and the user-end equipment 1 generates and stores own random digit individually, exchanges the random digit with each other, and combines the exchanged/received random digit with the generated/stored random digit according to the predetermined procedure. However the system-end equipment 2 and the user-end equipment 1 may generate their own random digit individually, and combines the generated random digit with own information unique to each of the system-end equipment 2 and the user-end equipment 1 according to the predetermined procedure.

The present exemplary embodiment, as has been described, provides the following advantages.

1. The system-end equipment 2 is not required to store individual secret information for each of the user-end equipment 1 in a form of database, since it can produce the information from the individual user-end equipment's information transmitted by the user-end equipment 1.

2. The user-end equipment 1 can make authentication of the system-end equipment 2, since the system-end equipment 2 is required to have secret information, which is assigned only to the legitimate system-end equipment, in order to reproduce the individual secret information of the user-end equipment 1.

3. Since the system generates random digits for key sharing, it can improve security in the public communications, which carries a large volume of transmission, and is therefore comparatively liable to unauthorized interception.

4. Since the system carries out a process of the key sharing in parallel with the authentication phase of the challenge response, it can reduce a number of communications sequences.

5. Since the system carries out authentication and cryptographic communications using random digits generated consecutively, it protects the cryptographic communications from being intercepted, since sufficient information is not disclosed even if either one of the system-end equipment and the user-end equipment is analyzed.

Second Exemplary Embodiment

Figure 2:
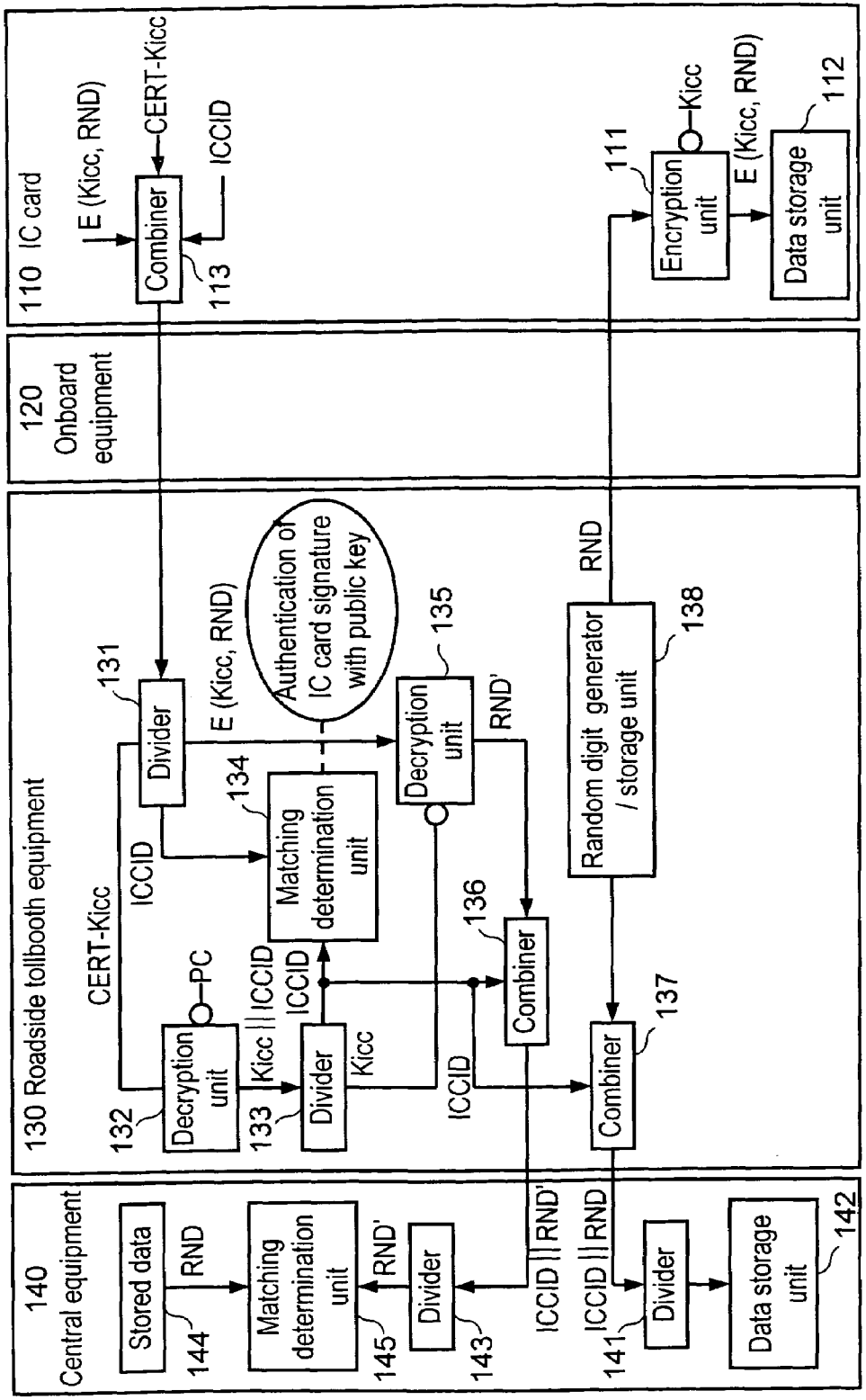
FIG. 2 is a block diagram depicting an ETC authentication system of a second exemplary embodiment of the present invention.

FIG. 2 is a diagram depicting an ETC authentication system and method as an example of a scheme, system, and equipment for inter-equipment authentication and key delivery of a second exemplary embodiment of the present invention. The ETC authentication system of the present exemplary embodiment executes a direct and dynamic one-way authentication (challenge response) of an IC card.

In FIG. 2, when an automobile equipped with onboard equipment 120 having an IC card 110 inserted therein passes by roadside tollbooth equipment (hereinafter referred to as "roadside equipment") 130, the roadside equipment 130 transmits a random digit (RND) generated therein as a challenge data to the IC card 110 via the onboard equipment 120. The IC card 110 encrypts the received random digit (RND) in an encryption unit 111 using a legitimate secret key Kicc, and stores the encrypted data E (Kicc, RND) in a data storage unit 112 within the IC card 110. In this exemplary embodiment, the roadside equipment 130 and the onboard equipment 120 are provided with a wireless, infrared, or the like communications device, as well as data transmission and reception means for transmitting and receiving data with each other. Also, the IC card 110 is provided therein with an antenna unit and an IC, so that it is capable of transmitting and receiving data with the onboard equipment 120 through magnetic field or electrostatic field. Accordingly, the IC card 110 is able to transmit and receive data with the roadside equipment 130 via the onboard equipment 120.

The IC card 110 transmits the encrypted data E (Kicc, RND) as a response data to the roadside equipment 130 via the onboard equipment 120. Prior to the transmission, the IC card 110 combines an ID of the IC card ("ICCID") and a certificate of individual IC card key CERT-Kicc with the encrypted data E (Kicc, RND) in a combiner 113 of the IC card.

The roadside equipment 130 divides the received data in a divider 131 into three data in their original states before the combination. In other words, the roadside equipment 130 reproduces the ICCID and the CERT-Kicc, at the same time with the response data E (Kicc, RND).

The roadside equipment 130 decrypts the certificate of individual IC card key CERT-Kicc in a decryption unit 132 using a validation key PC in its own possession. The roadside equipment 130 is able to reproduce the Kicc and the ICCID by dividing the decrypted data Kicc∥ICCID with a divider 133. The roadside equipment 130 makes a matching determination of the ICCID with the other ICCID reproduced by the divider 131, by comparing them in a matching determination unit 134. The roadside equipment 130 can thus authenticates a signature of the IC card ID (ICCID), if they match. Accordingly, the roadside equipment 130 can authenticate legitimacy of the certificate of individual IC card key CERT-Kicc through the authentication of signature, and thereby it can determine the Kicc is legitimate, since they are both reproduced at the same time. The divider 131, the decryption unit 132 and the divider 133 constitute a means for reproducing the secret key peculiar or unique to the IC card from data of the certificate of individual IC card key received from the IC card.

The roadside equipment 130 produces a random digit RND' by decrypting the response data, i.e. encrypted data E(Kicc, RND), in a decryption unit 135 using the reproduced Kicc as a key. The random digit RND', which is a response data produced in the decryption unit 135, is tentatively referred to as RND', because no verification has yet been made as to whether or not it matches with the challenge data RND reproduced and stored in the roadside equipment 130. The roadside equipment 130 is provided with a random digit generator/storage unit 138 for generating and storing a random digit RND.

The roadside equipment 130 combines in the combiner 136 the data RND', which is a response data decrypted in the decryption unit 135, with the ICCID divided by the divider 133. The roadside equipment 130 transmits the combined data ICCID∥RND' to central equipment (i.e. central processing equipment) 140.

On the other hand, the roadside equipment 130 combines in a combiner 137 the random digit RND, which is a challenge data reproduced and stored in the random digit generator/storage unit 138, with the ICCID divided by the divider 133, and transmits it to the central equipment 140 as a data ICCID∥RND.

The central equipment 140 receives the data ICCID∥RND, reproduces the random digit RND, i.e. the challenge data, by dividing it in a divider 141, and stores it in a data storage unit 142. The central equipment 140 also reproduces the random digit RND', or the response data, by dividing the data ICCID∥RND' in a divider 143. The central equipment 140 then make a matching determination of the reproduced random digit RND' with the random digit RND, i.e. a stored data 144 stored in the data storage unit 142, in a matching determination unit 145.

The central equipment 140 can authenticate that the IC card 110 has the legitimate secret key Kicc, if a result of the matching determination is positive between the random digit RND, or the challenge data having the same ICCID, and the random digit RND', or the response data. In this way, the central equipment 140 can make a direct authentication of the IC card ID dynamically and unilaterally.

In addition, and in parallel with the foregoing operation, the roadside equipment 130 transmits a challenge data (i.e. the random digit RND) generated by the random digit generator/storage unit 138 in the roadside equipment 130 to the onboard equipment 120 at the time when the onboard equipment 120 passes by the tollbooth. Upon completion of a predetermined procedure of the communications (Dedicated Short Range Communications, or "DSRC") between the onboard equipment 120 and the roadside equipment 130, the onboard equipment 120 sends the random digit RND to the IC card 110, and the IC card 110 encrypts it into data E(Kicc, RND). The IC card 110 stores the encrypted data E(Kicc, RND) in the data storage unit 112 as a response data.

Third Exemplary Embodiment

Figure 3:
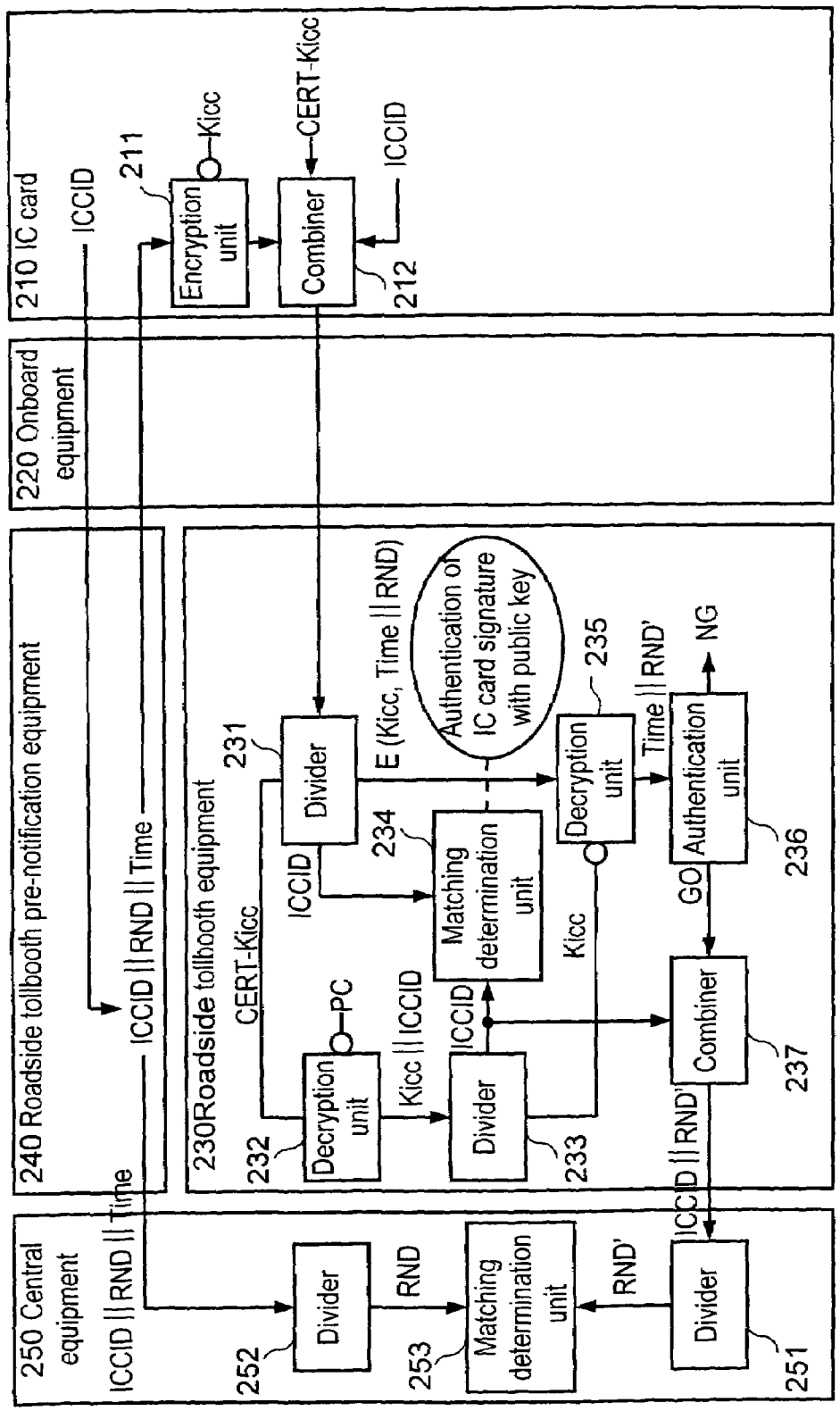
FIG. 3 is a block diagram depicting an ETC authentication system of a third exemplary embodiment of the present invention.

FIG. 3 is a diagram depicting an ETC authentication system and method as an example of a scheme, system, and equipment for inter-equipment authentication and key delivery of a third exemplary embodiment of the present invention. The ETC authentication system of the present exemplary embodiment executes a direct and dynamic authentication of an IC card, in the same manner as the second exemplary embodiment, with a combination of roadside tollbooth pre-notification equipment (hereinafter referred to as "roadside pre-notification equipment") and roadside tollbooth equipment ("roadside equipment").

In FIG. 3, when an automobile equipped with onboard equipment 220 having an IC card 210 inserted therein passes by roadside pre-notification equipment 240, which is installed before a tollbooth, e.g. 30 m to the tollbooth, the IC card 210 transmits an ID (ICCID) stored therein to the roadside pre-notification equipment 240 via the onboard equipment 220. The roadside pre-notification equipment 240 is provided with a random digit and time generator/storage unit for generating and storing a random digit (RND) and the time of day (Time). The roadside pre-notification equipment 240 produces a data ICCID∥RND∥Time by combining the ICCID transmitted from the IC card 210 with the random digit (RND) and the time of day (Time) generated therein, and transmits it to the IC card 210 and a traffic lane equipment (i.e. central processing equipment) 250.

The IC card 210 encrypts the random digit (RND) and the time of day (Time) among the received data in an encryption unit 211 using a legitimate secret key Kicc. The encryption into a data E (Kicc, Time∥RND) is carried out while the automobile moves from the roadside pre-notification equipment 240 to the tollbooth. The IC card 210 transmits the data E (Kicc, Time∥RND) along with the ID (ICCID) of the IC card 210 and a certificate of individual IC card key CERT-Kicc to roadside equipment 230 after combining them together in a combiner 212.

The roadside equipment 230 divides the transmitted data in a divider 231 into three data, i.e. the E (Kicc, Time∥RND), the ICCID, and the CERT-Kicc.

Then, the roadside equipment 230 produces a data Kicc∥ICCID by decrypting the certificate of individual IC card key CERT-Kicc in a decryption unit 232 using a validation key PC. The roadside equipment 230 reproduces the Kicc and ICCID by dividing the data Kicc∥ICCID in a divider 233. The roadside equipment 230 then makes a matching determination in a matching determination unit 234 by comparing the ICCID with the other ICCID reproduced by the divider 231. The roadside equipment 230 completes the authentication of signature of the IC card ID, if they match. Accordingly, the roadside equipment 230 can authenticate legitimacy of the certificate of individual IC card key CERT-Kicc, and thereby it can determine the Kicc is legitimate, since they are both reproduced at the same time. The roadside equipment 230 produces a data Time∥RND' by decrypting the encrypted data E(Kicc, Time∥RND) in a decryption unit 235 using the Kicc reproduced by the divider 233 as a key. The roadside equipment 230 further produces the random digit RND' and the time of day Time from the produced data Time∥RND'. The random digit produced by the decryption unit 235 is tentatively referred to as RND', because an authentication has not as yet been made as to whether or not it matches with the random digit RND reproduced in the roadside pre-notification equipment 240.

The roadside equipment 230 makes a confirmation with a validation unit 236 by calculating a difference in time between the produced time of day (Time) and time (Time') at which the automobile passes by the roadside pre-notification equipment 240. The roadside equipment 230 determines that the automobile has taken a legitimate time to pass through between the roadside pre-notification equipment 240 and the roadside equipment 230, if the difference is equal to or less than a predetermined time, e.g. "n" minutes. Or, the roadside equipment 230 determines that the automobile has not taken a legitimate time to pass through, i.e. an illegitimate passage, if the difference is more than the predetermined time of "n" minutes, and it hence places the IC card ID in a negative list.

The roadside equipment 230 combines the produced random digit RND' with the afore-cited ICCID reproduced by the divider 233, in a combiner 237. The roadside equipment 230 transmits the combined data ICCID∥RND' to the traffic lane equipment 250.

The traffic lane equipment 250 reproduces the RND' by dividing the data ICCID∥RND' with a divider 251. The traffic lane equipment 250 also reproduces in a divider 252 the random digit (RND) by dividing the data ICCID∥RND∥Time, which it has received previously from the roadside pre-notification equipment 240. The traffic lane equipment 250 then makes a matching determination in a matching determination unit 253 by comparing the random digit (RND) and the random digit RND'.

The traffic lane equipment 250 can verify that the random digit RND and the random digit RND', both of which have the same ICCID, are identical, if a result of the matching determination is positive. In the manner as described above, the traffic lane equipment 250 is thus able to make a direct and dynamic authentication of the IC card ID, since it can confirm that the IC card 210 has the legitimate secret key Kicc.

Fourth Exemplary Embodiment

Figure 4:
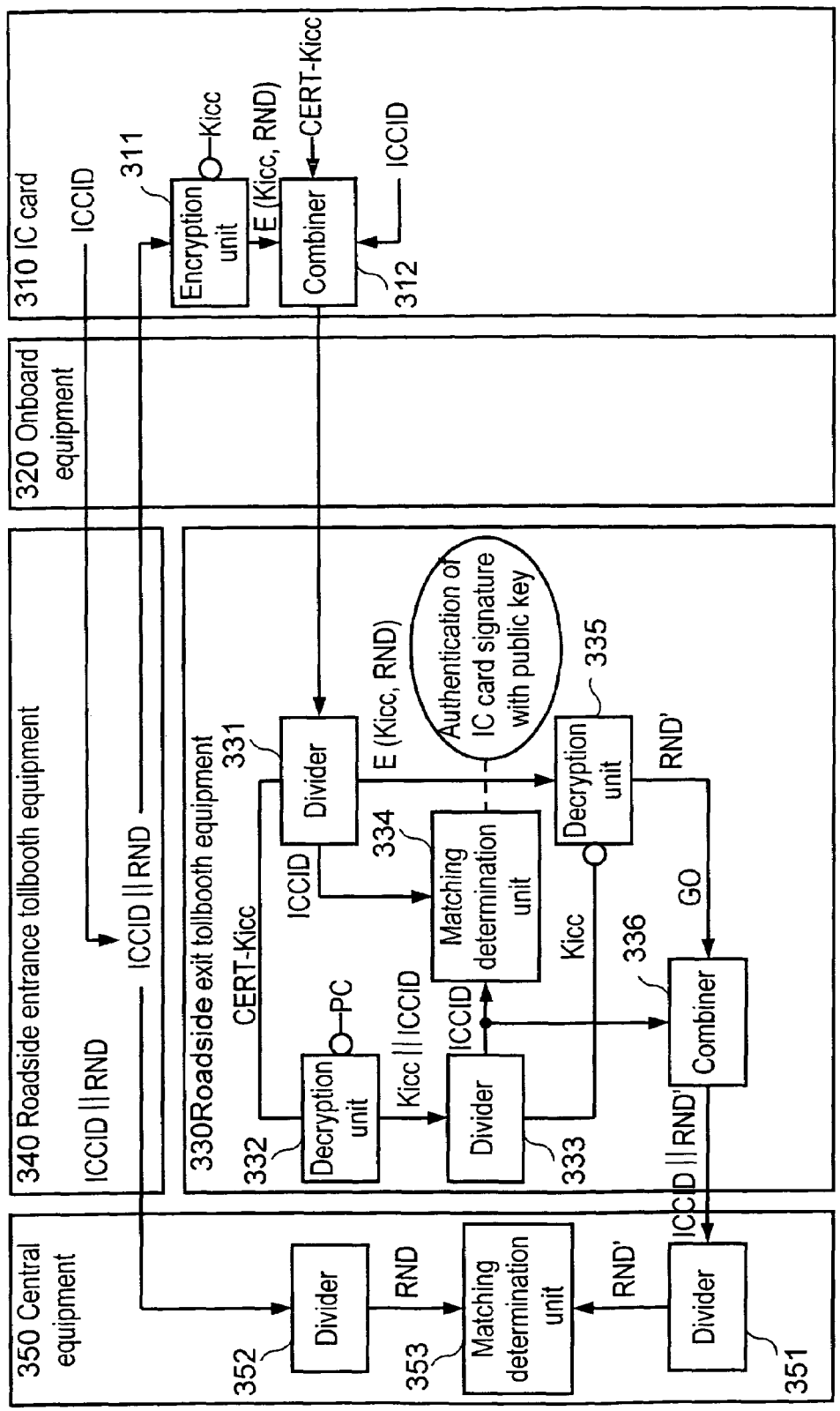
FIG. 4 is a block diagram depicting an ETC authentication system of a fourth exemplary embodiment of the present invention.
Figure 5:
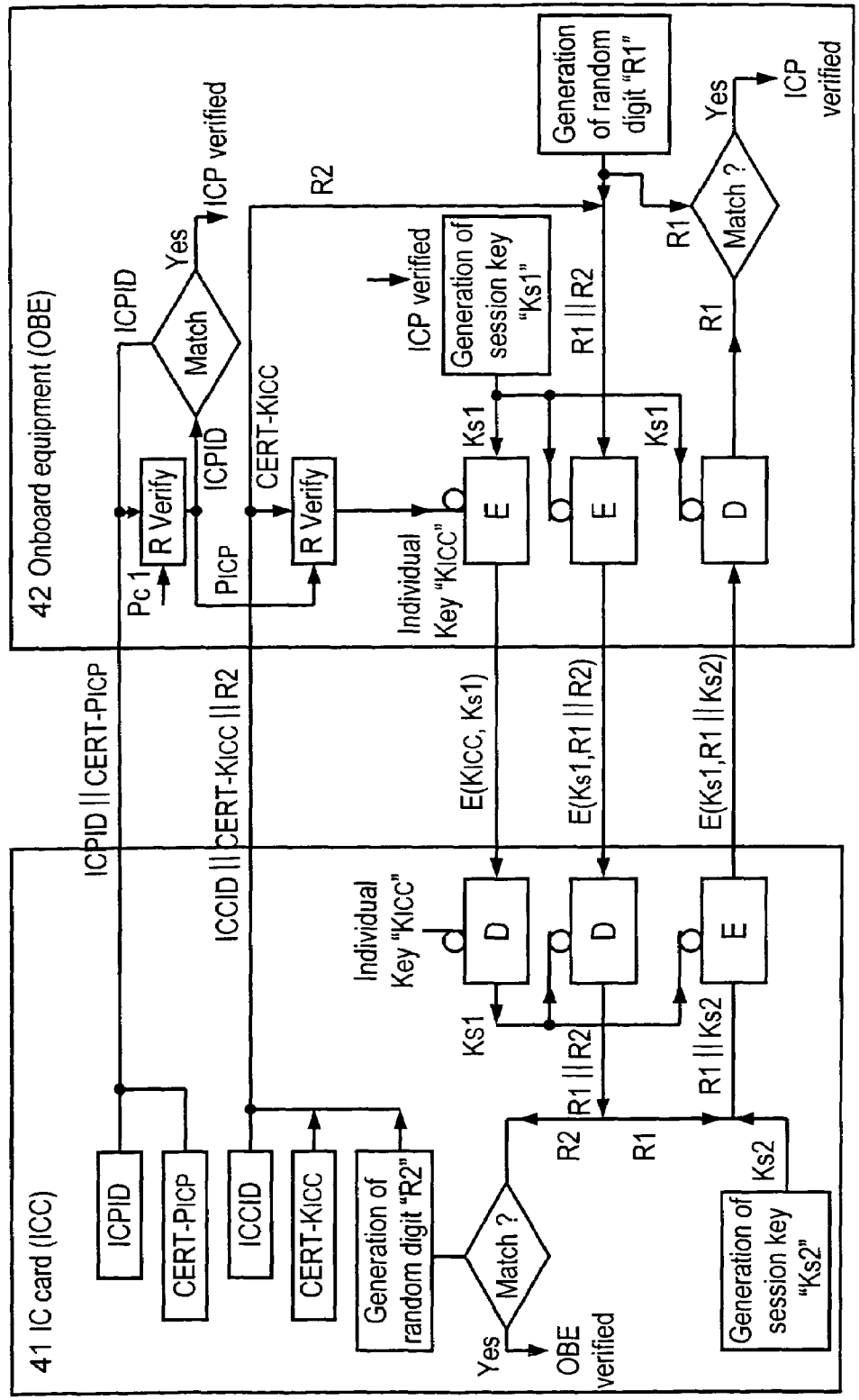
FIG. 5 is a diagram depicting an operation of mutual authentication between an IC card and onboard equipment, which constitute a part of an ETC authentication system of the prior art.
Figure 6:
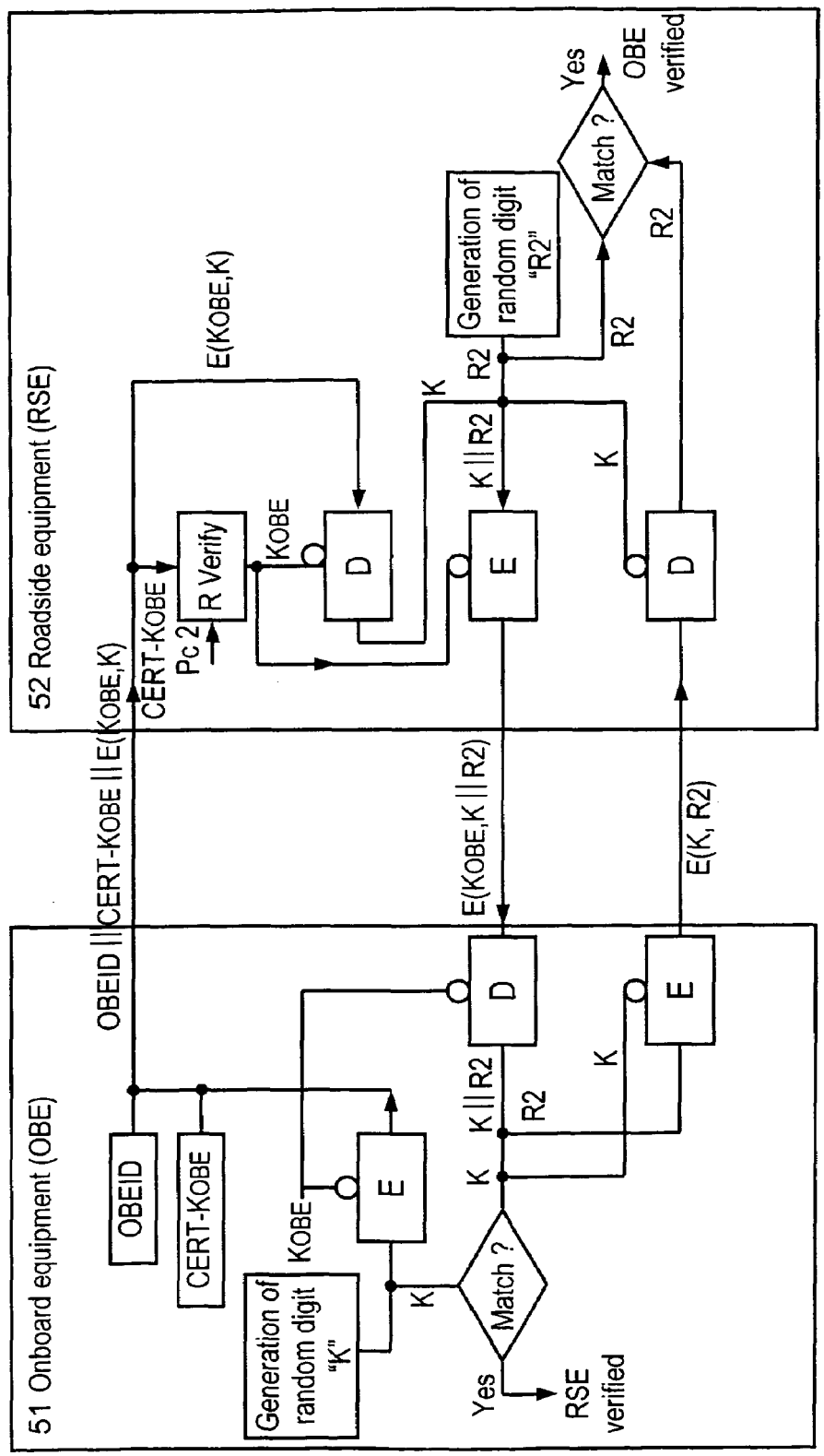
FIG. 6 is a diagram depicting an operation of mutual authentication between onboard equipment and roadside equipment, which constitute a part of the ETC authentication system of the prior art.

FIG. 4 is a diagram depicting an ETC authentication system and method as an example of a scheme, system, and equipment for inter-equipment authentication and key delivery of a fourth exemplary embodiment of the present invention. The ETC authentication system of the present exemplary embodiment executes a direct and dynamic authentication of an IC card, in the same manner as the third exemplary embodiment, with a combination of roadside entrance tollbooth equipment and roadside exit tollbooth equipment.

In FIG. 4, when onboard equipment 320 having an IC card 310 inserted therein passes under roadside entrance tollbooth equipment 340, the IC card 310 and the roadside entrance tollbooth equipment 340 exchange data with each other. That is, when the IC card 310 transmits an IC card ID (ICCID) to the roadside entrance tollbooth equipment 340, the roadside entrance tollbooth equipment 340 generates a random digit (RND) and transmits it as a challenge data to the IC card 310.

At the same time, the roadside entrance tollbooth equipment 340 produces a data ICCID||RND by combining the IC card ID (ICCID) with the random digit (RND), and transmits it to central equipment 350. All of the above processes are made while the onboard equipment 320 passes through the roadside entrance tollbooth equipment 340.

After the onboard equipment 320 has passed through the roadside entrance tollbooth equipment 340, and before it reaches to roadside exit tollbooth equipment 330, the IC card 310 encrypts the received random digit (RND) in an encryption unit 311 using a legitimate secret key Kicc, i.e. producing an encrypted data E(Kicc, RND), and stores the data.

Since the IC card 310 has stored the encrypted data, the IC card 310, which is inserted in the onboard equipment 320, is able to transmits the encrypted data, or E(Kicc, RND), to the roadside exit tollbooth equipment 330 when it passes by the roadside exit tollbooth equipment 330.

The IC card 310 combines the encrypted data E(Kicc, RND) together with the IC card ID (ICCID) and a certificate of individual IC card key CERT-Kicc in a combiner 312, and transmits it to the roadside exit tollbooth equipment 330.

The roadside exit tollbooth equipment 330 receives the combined data, and divides it into three data, i.e. the E(Kicc, RND), the ICCID, and the CERT-Kicc, by a divider 331.

The roadside exit tollbooth equipment 330 has a validation key PC, so that it can reproduce a data Kicc||ICCID by decrypting the certificate of individual IC card key CERT-Kicc in a decryption unit 332 using the validation key PC, and then the Kicc and the ICCID by dividing the decrypted data in a divider 333.

The roadside exit tollbooth equipment 330 makes a matching determination of the ICCID reproduced by the divider 333 with the other ICCID reproduced by the divider 331 in a matching determination unit 334. The roadside exit tollbooth equipment 330 completes the authentication of a signature of the IC card ID, if they match. That is, if they match, the roadside exit tollbooth equipment 330 can determine that the Kicc is legitimate when it can authenticate legitimacy of the certificate of individual IC card key CERT-Kicc, since they are both reproduced at the same time. The roadside exit tollbooth equipment 330 then produces a random digit RND' by decrypting the encrypted data E(Kicc, RND) in a decryption unit 335 using the Kicc reproduced by the divider 333 as a key. The random digit produced by the decryption unit 335 is tentatively referred to as RND', because an authentication has not as yet been made as to whether or not it matches with the random digit RND reproduced in the roadside entrance tollbooth equipment 340.

The roadside exit tollbooth equipment 330 combines the random digit RND' produced therein with the ICCID reproduced by the divider 333 in a combiner 336, and transmits it as a data ICCID||RND' to the central equipment 350.

The central equipment 350 reproduces the random digit RND' by dividing the data ICCID||RND' with a divider 351. The central equipment 350 has the random digit RND stored therein, since it has reproduced the random digit RND by dividing in the divider 352 the data ICCID||RND received from the roadside entrance tollbooth equipment 340. Thus, the central equipment 350 make a matching determination by comparing the reproduced random digit RND' with the stored random digit RND in a matching determination unit 353.

Accordingly, the central equipment 350 can make the matching determination between the random digit RND and the random digit RND' having the same ICCID reproduced at the entrance and the exit. In this way, the central equipment 350 is able to make a dynamic authentication of the IC card ID, since it can confirm that the IC card 310 has the legitimate secret key Kicc.

As has been described, the ETC authentication system and the method of authentication of this exemplary embodiment is able to execute a direct and dynamic authentication of the IC card, since it can centralize random digit data into the central equipment with a combination of the roadside equipments provided at the entrance tollbooth and the exit tollbooth.

Although what has been described are the systems employing a type of key used in the public key cryptosystem, i.e. the DES cryptography, as the legitimate secret key Kicc, the key needs not be restricted to a public key, and it can be any other key employed in other crypto-systems such as the elliptic curve cryptography, the RAS cryptography, and the like.

If such is the case, the system becomes capable of making a signature-authentication within a short period of time, in which an automobile passes through an entrance tollbooth equipped with a dual antenna, by adopting an exclusive LSI for the elliptic curve cryptography, for example, in the system.

According to the present invention, the system-end equipment is not required to store individual secret information for each of the user-end equipment in a form of database, since it can reproduce the individual secret information from a key capsule data transmitted by the user-end equipment.

With the present invention, the user-end equipment is able to authenticate the system-end equipment, since the system-end equipment is required to use a secret information that only the legitimate system-end equipment possesses in order to reproduce the individual secret information for the user-end equipment.

Also, the present invention enables the system-end equipment to make authentication for legitimacy of the user-end equipment by using individual user-end equipment's secret information, which can be shared without storing the individual secret information for each of the user-end equipment in a form of database, and a secret key cryptography, thereby enabling the system-end equipment to make a cryptographic communications.

Further, the present invention does not require the system-end equipment to store the individual secret information for each of the user-end equipment in a form of database, as it uses information shared mutually by exchanging secret information possessed individually with the user-end equipment. Because of this invention, even if either the system-end equipment or the user-end equipment is analyzed, the cryptographic communications can not be interpreted only with a limited information disclosed by the analysis.

According to the present invention, the system-end equipment and the user-end equipment make a cryptographic communications by exchanging secret information possessed individually, and combining the information to generate new secret information. Therefore, even if either the system-end equipment or the user-end equipment is analyzed, the cryptographic communications can not be interpreted only with a limited information disclosed by the analysis.

In the present invention, the system-end equipment and the user-end equipment generate secret information by encrypting the exchanged and combined information with the individual user-end equipment's secret information, and make a cryptographic communications using this secret information. Therefore, even if communications in both ways between the system-end equipment and the user-end equipment is intercepted, the encrypted secret information can not be comprehended, and the cryptographic communications can not be interpreted only with information disclosed by the interception.

According to the present invention, the system-end equipment and the user-end equipment generate their respective random digits individually, exchange the information with each other as separate secret information, and mutually share secret information peculiar to the system-end equipment and the user-end equipment by combining the exchanged random digits according to a predetermined procedure, in order to make a cryptographic communications. As a result, even if the communications in both ways between the system-end equipment and the user-end equipment is intercepted, and the individual user-end equipment's secret information is disclosed, the subsequent cryptographic communications can hardly be interpreted.

Also, according to the present invention, the system-end equipment and the user-end equipment generate their respective random digits individually, combine own information unique to each of the system-end equipment and the user-end equipment to the random digits according to a predetermined procedure, generate secret information by encrypting the combined information with the individual user-end equipment's secret information, and exchange the encrypted information with each other as individual secret information. The system-end equipment and the user-end equipment then decrypt the combined information using the individual user-end equipment's secret information shared between them by the means described in the first exemplary embodiment, break the combination according to a predetermined procedure, reproduce the random digits exchanged with each other and mutually share the reproduced random digits as individual secret information unique to each of the system-end equipment and the user-end equipment in order to make a cryptographic communications. With this invention, even if the communications is intercepted in both ways between the system-end equipment and the user-end equipment, and a replay attack is attempted, a content of the cryptographic communications can not be interpreted.

Further, according to the present invention, the system-end equipment and the user-end equipment generate their respective random digits individually, and exchange the random digits with each other. The system-end equipment and the user-end equipment again generate new random digits individually, combine these random digits together according to a predetermined procedure, generate secret information by encrypting the combined information using the individual user-end equipment's secret information, and exchange the encrypted information with each other as individual secret information. In the same manner as the preceding paragraph, the system-end equipment and the user-end equipment then decrypt the combined information using the individual user-end equipment's secret information shared between them, break the combination according to a predetermined procedure, reproduce the random digits with each other and mutually share the random digits as individual secret information unique to each of the system-end equipment and the user-end equipment in order to make a cryptographic communications. With this invention, even if the communications is intercepted in both ways between the system-end equipment and the user-end equipment, a replay attack is attempted, and the individual user-end equipment's secret information is disclosed, a content of the cryptographic communications can hardly be interpreted nevertheless.

Furthermore, the ETC authentication system and a method of authentication of the present invention enables the roadside equipment to make a direct authentication of an IC card ID by way of making the roadside equipment to carry out a signature authentication for signature information received at the same time with the IC card ID, and also the central processing equipment to simultaneously make a matching determination of challenge data encrypted in the IC card, and decrypted by the roadside equipment.

Still, the ETC authentication system and a method of authentication of the present invention employs two units of roadside equipment. The ETC authentication system and the method thereof enables the first roadside equipment to carry out a writing process to an IC card while an automobile travels from the first roadside equipment to the second roadside equipment, the second roadside equipment to make an authentication of an IC card ID directly by using data (response data) written in the IC card, and also the central processing equipment to make a matching determination of challenge data, in order to make direct authentication of the IC card ID.

What is claimed is:

1. An equipment authentication and cryptographic communication system, comprising: user-end equipment, system-end equipment, and a key center for administrating authentication of equipment in said system, wherein;

said user-end equipment provided with individual user-end equipment information issued by said key center and individual user-end equipment secret information corresponding to said individual user-end equipment's information, and said user-end equipment transmits said individual user-end equipment information to said system-end equipment;

said system-end equipment receives said individual user-end equipment information from said user-end equipment, reproduces by a system conversion said individual user-end equipment secret information from said received individual user-end equipment information using an equivalent secret key cryptographic algorithm of the key center, and authenticates said user-end equipment by confirming that said user-end equipment legitimately has said individual user-end equipment secret information by using a challenge response utilizing a common key cryptographic algorithm; and said user-end equipment and said system-end equipment execute a cryptographic communication with each other using said individual user-end equipment secret information, said system-end equipment is provided with a secret-key cryptographic algorithm, and reproduces said individual user-end equipment secret information by a system conversion of said individual user-end equipment information using a secret key, said system-end equipment and said user-end equipment are both provided with common secret information shared therebetween by exchanging individually held secret information, said system-end equipment and said user-end equipment (a) exchange with each other individually held secret information, and (b) generate new secret information by combining said individually held secret information and said secret information exchanged therebetween according to a predetermined procedure, said system-end equipment and said user-end equipment use said individual user-end equipment secret information for encrypting said new secret information, which is provided by combining said information and said exchanged information, and said system-end equipment and said user-end equipment (a) individually generate random digits, (b) exchange said generated random digits with each other, and (c) share the same secret information particular to said system-end equipment and said user-end equipment by combining said generated random digits and said exchanged random digits according to a predetermined procedure.

2. The equipment authentication and cryptographic communication system according to claim 1, wherein said system-end equipment and said user-end equipment (a) individually generate random digits, (b) combine said random digits with their own information particular to each of said system-end equipment and said user-end equipment according to a predetermined procedure, (c) generate encrypted data by encrypting the combined information using said individual user-end equipment secret information, (d) exchange said encrypted data with each other, (e) generate decrypted data by decrypting said exchanged encrypted data using said individual user-end equipment's secret information, and (f) reproduce each of said mutually exchanged random digits by dividing the combination of said decrypted data according to a predetermined procedure.

3. The equipment authentication and cryptographic communication system according to claim 2, wherein said system-end equipment and said user-end equipment (a) individually generate and store random digits, (b) exchange said random digits with each other, (c) combine said exchanged random digits with said individually generated and stored random digits according to a predetermined procedure, (d) generate encrypted data by encrypting said combined information using said individual user-end equipment secret information, (e) exchange said encrypted data with each other, (f) generate decrypted data by decrypting said exchanged encrypted data using said individual user-end equipment secret information, and (g) reproduce each of said mutually exchanged random digits by dividing the combination of said decrypted data according to a predetermined procedure.

4. The equipment authentication and cryptographic communication system according to claim 3, wherein said system-end equipment and said user-end equipment individually execute matching determinations by comparing said mutually exchanged random digits, which are produced by dividing the combination of said decrypted data according to the predetermined procedure, with said individually generated and stored random digits.

5. The equipment authentication and cryptographic communication system according to claim 4, wherein said system-end equipment and said user-end equipment produce and store the same data by combining said exchanged and received random digits and said individually generated and stored random digits according to the predetermined procedure, and mutually share said data as a common key particular to both said system-end equipment and said user-end equipment, if said matching determination produces a positive result.

6. An equipment authentication and cryptographic communication system, comprising: user-end equipment, system-end equipment, and a key center for administrating authentication of equipment in said system, wherein;

said key center is provided with a first system converter for generating user-end equipment secret information from user-end equipment information;

said user-end equipment is provided with a first storage unit for storing said user-end equipment information provided by said key center, a second storage unit for storing said user-end equipment secret information, a first encryption unit, and a first decryption unit; and said system-end equipment is provided with a second system converter for generating said user-end equipment secret information by a system conversion of said user-end equipment information received from said user-end equipment, a second encryption unit, and a second decryption unit, said second system converter using an equivalent secret key cryptographic algorithm of the first system converter to generate said user-end equipment secret information from said received user-end equipment information, said user-end equipment and said system-end equipment share and utilize said user-end equipment secret information as a common key for encryption and decryption in said first encryption unit and said first decryption unit in said user-end equipment, and said second encryption unit and said second decryption unit in said system-end equipment, said user-end equipment further comprises a first random digit generator for generating a random digit, a second random digit generator for generating a random digit, a first combiner for combining a pair of random digit data according to a predetermined procedure, a first divider for dividing a combined pair of random digit data to reproduce original random digits prior to combining, a first common key generator for combining a pair of random digit data according to a predetermined procedure, and a first matching determination unit for determining if two random digit data match each other; and said system-end equipment further comprises a third random digit generator for generating a random digit, a fourth random digit generator for generating another random digit, a second combiner for combining a pair of random digit data according to a predetermined procedure, a second divider for dividing a combined pair of random digit data to reproduce original random digits prior to combining, a second common key generator for combining a pair of random digit data according to a predetermined procedure, and a second matching determination unit for determining if two random digit data match each other.

7. A method of equipment authentication and cryptographic communication for an equipment authentication and cryptographic communication system including user-end equipment, system-end equipment, and a key center for administrating authentication of equipment in said system, said method comprising the steps of:

generating user-end equipment secret information from user-end equipment information in said key center;

receiving said user-end equipment information and said user-end equipment secret information in said user-end equipment from said key center;

receiving said user-end equipment information from said user-end equipment, and generating said user-end equipment secret information from said user-end equipment information received in said system-end equipment by a system conversion using an equivalent secret key cryptographic algorithm of said key center;

using said user-end equipment secret information as a common key for encryption and decryption in both of said user-end equipment and said system-end equipment;

generating a first random digit in said user-end equipment, and transmitting said first random digit to said system-end equipment;

generating a second random digit in said system-end equipment, combining said second random digit and said first random digit received from said user-end equipment, encrypting combined data of said second random digit and said first random digit using said common key, and transmitting said encrypted data to said user-end equipment;

decrypting said encrypted data received in said user-end equipment using said common key, and reproducing said first random digit and said second random digit by dividing decrypted data of said encrypted data received in said user-end equipment;

determining in said user-end equipment if said first random digit reproduced in the preceding decryption step matches with another first random digit generated therein;

generating a third random digit in said user-end equipment, combining said third random digit and said second random digit reproduced in the decryption step, encrypting combined data of said third random digit and said second random digit using said common key, and transmitting encrypted data of said combined data to said system-end equipment;

generating a fourth random digit in said system-end equipment, and transmitting said fourth random digit to said user-end equipment;

combining said fourth random digit received in said user-end equipment from said system-end equipment and said third random digit generated therein, encrypting combined data of said fourth random digit and said third random digit using said common key, and transmitting encrypted data of said combine data to said system-end equipment;

decrypting said encrypted data received in said system-end equipment using said common key, and reproducing said third random digit and said fourth random digit by dividing decrypted data of said encrypted data received in said system-end equipment; and determining in said system-end equipment if said fourth random digit reproduced in the preceding decryption step matches with another fourth random digit generated therein.

8. The method of equipment authentication and cryptographic communication according to claim 7 further comprising the steps of:

producing data in said system-end equipment for use as a common key for cryptographic communication by combining said second random digit generated therein with said third random digit reproduced by decryption; and producing data in said user-end equipment for use as a common key for cryptographic communication by combining said third random digit generated therein and said second random digit reproduced by decryption.

\* \* \* \* \*